US012190538B2

(12) United States Patent
Kim

(10) Patent No.: US 12,190,538 B2
(45) Date of Patent: Jan. 7, 2025

(54) OPTICAL SELF POSITIONING SYSTEM AND METHOD THEREOF

(71) Applicant: Yoon Phil Kim, Wayland, MA (US)

(72) Inventor: Yoon Phil Kim, Wayland, MA (US)

( * ) Notice: Subject to any disclaimer, the term of this patent is extended or adjusted under 35 U.S.C. 154(b) by 416 days.

(21) Appl. No.: 17/678,145

(22) Filed: Feb. 23, 2022

(65) Prior Publication Data

US 2022/0180550 A1    Jun. 9, 2022

Related U.S. Application Data

(63) Continuation-in-part of application No. 16/231,444, filed on Dec. 22, 2018, now Pat. No. 11,448,509.

(30) Foreign Application Priority Data

Mar. 11, 2021   (KR) .................. 10-2021-0031782

(51) Int. Cl.
*G06T 7/70*     (2017.01)
*G06V 10/24*    (2022.01)
*G06V 20/56*    (2022.01)

(52) U.S. Cl.
CPC ............. *G06T 7/70* (2017.01); *G06V 10/245* (2022.01); *G06V 20/56* (2022.01)

(58) Field of Classification Search
CPC ........ G06V 20/56; G06V 10/245; G06T 7/70; G06T 7/73; G06T 2207/30204
USPC ........................................................ 702/150
See application file for complete search history.

(56) References Cited

U.S. PATENT DOCUMENTS

| 8,351,704 B2* | 1/2013 | Kmiecik ............ G01C 21/3852 |
| | | 382/190 |
| 2015/0154773 A1* | 6/2015 | Cosenza ................. G01C 21/20 |
| | | 345/619 |

OTHER PUBLICATIONS

Zhu, CN 105437251 A: "Method And Device For Locating The Position Of The Robot", Date Published: Mar. 30, 2016 (Year: 2016).*

* cited by examiner

*Primary Examiner* — John H Le
(74) *Attorney, Agent, or Firm* — Park & Associates IP Law Office

(57) ABSTRACT

An optical recognition based positioning method and a positioning system, which can replace or compensate conventional satellite-based GPS, is provided. A position is determined utilizing a digital image, which captured a set of optical marks of known geographic coordinates. The distances in pixel coordinates of the optical marks within the digital image are converted into an angle at the camera between the actual geographical coordinate of the optical marks. A first group of points having the same angle as the first and second optical marks are identified. A second group of points having the same angle as the second and third optical marks are identified. Also, a third group of points having the same angle as the first and third optical marks are identified. Then, a point that co-exist in the first, second and the third group is identified as the geographical location of the positioning module.

19 Claims, 8 Drawing Sheets

OPTICAL SELF POSITIONING SYSTEM AND METHOD THEREOF

REFERENCE TO RELATED APPLICATIONS

This is a continuation in part of pending U.S. patent application Ser. No. 16/231,444 filed on Dec. 22, 2018, and claims the priority benefit of Korean Patent Application No. 10-2021-0031782 filed on Mar. 11, 2021, the entire contents of which are incorporated herein by reference.

FIELD OF THE INVENTION

The invention relates to a method and a system for tracking position of an object, and more particularly relates to determining the location of a vehicle.

BACKGROUND OF THE INVENTION

Various known navigation and positioning systems enable people in cars, boats, aircraft, and other moveable objects to efficiently travel between given locations. Knowing a precise current geographic location or starting location and a desired destination or ending location enables navigation systems to provide customized directions that indicate which direction that moveable object should travel to reach the destination or ending location. Various known navigation systems use path-planning algorithms that combine knowledge of conduits (such as streets, bridges, or traffic rules), obstacles (such as freeway congestion), and current real-time positioning information to determine and output detailed directions.

Global Positioning System (GPS) or other Global Navigation Satellite System (GNSS) receivers operate by continuously tracking line of sight signals from at least four or more satellites. However, the theoretical minimum number of satellites required to accurately determine a position of the satellite receiver may not be available or obstructed under certain conditions. In urban areas with high rise buildings, reliable positioning data from a GPS receiver with differential correction may not be available because of attenuation from a building or otherwise. There have been several attempts to address the sporadic loss of a GPS signal; however, the need for accurate absolute positioning in urban environments for transportation systems has few practical yet technically feasible solutions.

Some solutions have attempted to determine a location by using triangulation method based on the distance from the vehicle to multiple beacons. For instance, a vehicle, at unknown coordinates broadcasts a signal, and the broadcast is received at three beacons of known coordinates. Based on the three measured time of arrivals, the processing algorithm computes an estimate of the time of transmission, from which the distance between the vehicle and the beacons can be calculated. When the algorithm computes the distances between the three beacons to the vehicle, three circles can be identified using the distance serving as the radius of the respective circle. There will be a common point of intersection of those circles, which is the vehicle's location. This method, however, suffers from reflections, multi-path reception, attenuation, or other propagation issues, and oftentimes produce unreliable or anomalous position readings. Signal strength and attenuations factors to and from the vehicle to each of the beacons will vary, and such variation needs to be considered when obtaining the distance between the vehicle and each of the beacons. If not done correctly, the three computed distances may not have a common point of intersection.

As described, those navigation aiding systems have various known issues or problems, and the overall need for more accurate navigation systems remains an issue largely unaddressed by currently known commercially available navigation systems. Accordingly, it may be desirable to provide a new positioning system that analyzes optical marks in captured images on a pixel-by-pixel basis, and not rely on distance from the vehicle to the beacons at known locations.

SUMMARY OF THE INVENTION

Accordingly, example embodiments of the present disclosure are provided to substantially obviate one or more problems due to limitations and disadvantages of the related art. Various embodiments of the present disclosure solve the above problems by providing a precise and accurate limited area positioning system that utilizes the location of the optical marks and the angle in which the positioning module is located relative to a set of optical marks.

An aspect of the present disclosure is directed to a positioning system. In an embodiment of the positioning system, the positioning system includes a positioning module, which is interconnected with a camera module. The camera module has a predetermined field of view (FOV), which is the area of the inspection that can capture on the camera's image sensor. The wider the field of view of the camera module, the wider the area that is captured in the digital image. The image sensor of the camera module has a predetermined pixel resolution (X pixels width by Y pixels height). Accordingly, each pixel records a portion of a digital image captured by the camera module. In other words, the width of each pixel can be interpreted as a fraction of horizontal angle of view of the camera module, which can serve as the conversion rate for converting a pixel distance into an angle. Similarly, the height of each pixel can be interpreted as a fraction of vertical angle of view of the camera module. At least three optical marks are placed at a predetermined geographic location (i.e., longitude and latitude coordinates), and their geographic coordinates is stored in a database accessible by the positioning system. The positioning system further includes a processor, which is configured to operate the camera module to take one or more digital images of the observing area from the viewpoint of the positioning system; process the obtained digital image(s) for the presence of at least three optical marks within the obtained digital image(s); determine the pixel distance between every pair of optical marks within the digital image, which is the number of pixels (in x-direction) from the x-pixel coordinate of one optical mark to the x-pixel coordinate of another optical mark in the digital image; convert each pixel distance into an angle subtended between the two optical marks associated with the pixel distance by using the predetermined conversion rate; generate at least three coordinate lists, in which each coordinate list consists of the geographic coordinates of points that forms the converted angle subtended between the geographic x-coordinate of the corresponding pair of optical marks; and identify the geographic coordinate of the point that exists in said at least three coordinate lists as the location of the positioning module.

In an embodiment of the positioning system, the optical marks are optically recognizable machine-readable form. (barcode, QR code, mix with landmark)

In an embodiment of the positioning system, the pixel with the lowest x-pixel coordinate among the pixels of the respective optical mark is used as the reference for determining the pixel distance between the optical marks in the digital image.

In an embodiment of the positioning system, the median x-pixel coordinate value of the pixels of the respective optical mark is used as the reference for determining the pixel distance between the optical marks in the digital image.

In an embodiment of the positioning system, the positioning module generates the coordinate list upon identifying the angle subtended between the given pair of optical marks.

In an embodiment of the positioning system, the coordinate lists are retrieved from a coordinate list database containing a plurality of pre-calculated coordinate lists for pairs of optical marks.

In an embodiment of the positioning system, the positioning module is configured to determine its location based on three optical marks that are most nearly located to the positioning module.

In an embodiment of the positioning system, the positioning module is configured to disregard optical marks which do not span across a minimum number of pixels in x-axis.

In an embodiment of the positioning system, the positioning module is configured to disregard optical marks captured at the edge-region of the image.

In an embodiment of the positioning system, the conversion rate used for the pixels at the edge-region of the image is larger than the conversion rate for the pixels at the mid-region of the image.

In an embodiment of the positioning system, the positioning module crops the edge-region of the image.

In an embodiment of the positioning system, the positioning module is configured to generate a single continuous image by stitching at least two digital images.

In an embodiment of the positioning system, the positioning module is provided with a plurality of cameras, each camera covering a field of view that is overlapping at least some field of view of another camera.

In an embodiment of the positioning system, the positioning module is configured to resample the digital image into a higher resolution when the positioning module is operating in an accuracy mode. (not when it is operating in normal mode, which may be automatically switched depending on the moving speed)

Another aspect of the present disclosure provides method for identifying location of a positioning module by using a digital image. In an exemplary embodiment of the present disclosure, the method comprises a step for capturing a digital image from a viewpoint of a positioning module. The captured digital image from the viewpoint of the positioning module has a predetermined resolution of X pixel width by Y pixel height. The captured digital image contains at least three optical marks (i.e., a first optical mark, a second optical mark and a third optical mark). Each of the optical marks captured within the digital image has already been positioned, and therefore their distinct geographic coordinates are known. The method also includes a step for determining pixel coordinates of each of the optical marks captured within the digital image. Here, the pixel coordinate means the x-pixel coordinate and the y-pixel coordinate (x, y) of a subject within the digital image in reference to the M by N resolution (often width by height) of the digital image. After the pixel coordinates of the optical marks are identified, pixel distances between each pair of optical marks are calculated. Once the pixel distances are calculated, each of the pixel distances are converted into an actual geographical angle by applying a predefined multiplier (i.e., conversion rate). The multiplier depends on the specific degree of angle represented by each pixel in x-pixel coordinate. Based on the converted angle and the geographical coordinates of the two optical marks associated with the corresponding converted angle, a list of points where the converted angle can be formed between the pair of the optical marks are generated. When the coordinate list for each pair of at least three optical marks are generated, a point that is present in all three coordinate lists is identified, and the geographic coordinate of the identified point is provided as the location of the positioning module.

Yet another aspect of the present disclosure is directed to a positioning module. In an embodiment, the positioning is provided with a camera module for capturing a digital image of a scene covered by a field of view of the camera module. The camera module is provided with an image sensor with a predetermined pixel resolution so that the captured digital image is recorded as X (width) by Y (height) resolution image. The positioning module is operatively connected to a database, which stores geographic coordinates of optical marks. The positioning module is provided with a processor, and the processor is configured to: process the digital image taken by the camera module to identify at least three optical marks therein to identify the pixel coordinate of the optical marks; calculate pixel distance in between each pairs of the optical marks in the image; convert each of the calculated pixel distances into an angle subtended between the corresponding pair of the optical marks; generate look-up tables associated with each of the converted angles, in which each look-up table consists of geographic coordinates of points where the corresponding angle can be formed between the geographic coordinate of the corresponding pair of optical marks; and identify a coordinate of a point that is present is all three look-up tables as a coordinate of the positioning module.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention.

DETAILED DESCRIPTION OF THE INVENTION

Hereinafter, the present invention will be described in more detail with reference to the following Examples. However, these Examples are set forth to illustrate the present invention, and the scope of the present invention is not limited thereto.

The positioning system of the present disclosure determines the location of the positioning module using images taken by the camera module without relying on the distance between the optical marks and the positioning module. Instead of relying on the distance information between the optical mark and the positioning module, the positioning system of the present invention utilizes the angle at the positioning module subtended between at least three pairs of optical marks, in which the angle is determined from the pixel distance between a pair of optical marks depicted in a digital image captured by the camera module. The pixel distance in this disclosure refers to the number of pixels between one specific pixel of a digital image to another specific pixel of the digital image in an x-axis. As will be described in more detail below, the digital image has a certain number of total pixels in relation to image sensors. In other words, pixel resolution is represented by a number of pixels in width-by-a number of pixels in height, and each width of the pixel can represent a certain fraction of field of view of the camera module. Accordingly, the pixel distance can be converted into an angle at the camera module (or the positioning module as the case may be) subtended between the two optical marks associated with that pixel distance. Knowing the geographical coordinates of a pair of optical marks and the angle subtended between that pair of optical marks, a list of coordinates of points that exhibit the same angle in reference to that pair of optical marks can be generated. When such list is generated from at least three different pairs of optical marks captured in the digital image, the coordinate of a point that is present in lists can be determined as the location of the positioning module.

Figure 1A:
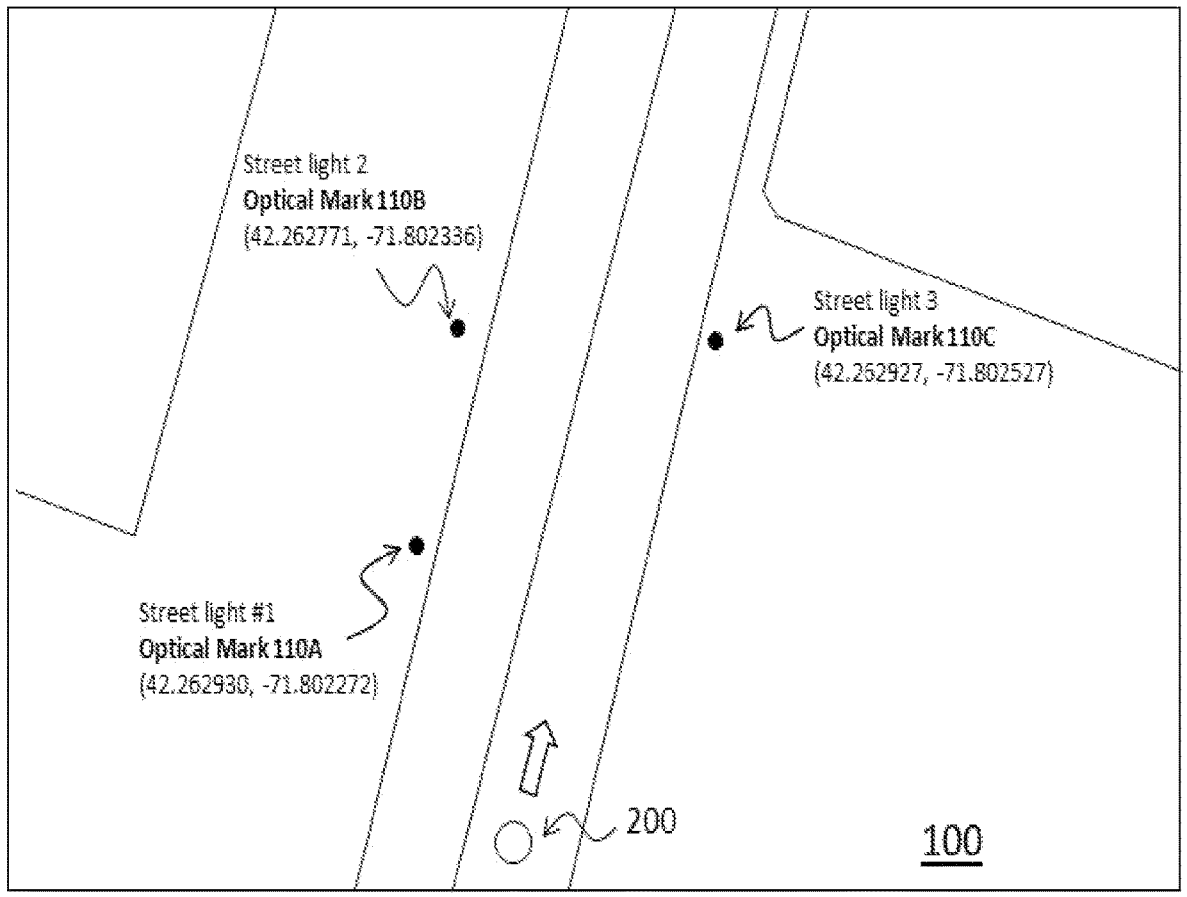
FIG. 1A is a schematic aerial view of one example of a working environment adapted for the positioning system 100 using optical marks 110, according to aspects of the present invention.

FIG. 1A shows an aerial view of an exemplary working environment of a positioning system 100, in which optical marks 110A-110C are deployed nearby the street where a vehicle with positioning module 200 is traveling. Also, FIG. 2B shows the front view of the working environment that was shown in FIG. 1A. As described above, the positioning system 100 requires at least three optically recognizable optical marks located within a sufficiently close proximity to be represented in a digital image. These optical marks may be placed on various infrastructure within the environment, such as, for example, on roadside lamp posts or utility poles, buildings, or other infrastructure objects. In the illustrated example, the first optical mark 110A, the second optical mark 110B and the third optical mark 110C are deployed on street lights alongside a road. However, it should be noted that the optical marks 110 can be placed on other types of infrastructure, including but not limited to, utility poles, street signs, traffic signal light poles, and even on buildings. Any infrastructure in the optically recognizable range of the positioning module 200 and proximate to the roadway may be used.

Each optical mark 110 may carry information indicating its location, or information from which its position may be determined. The optical marks 110 may carry information that specifies the optical marks 110, and the location of that optical marks 110 can be later determined by looking up the location information that corresponds to the optical mark 110, which may be stored elsewhere and accessible via available communication protocol. Alternatively, the geographic location information could be directly carried by the optical marks 110, allowing the positioning system to know the geographical coordinate of the optical mark 110 without having to cross-reference the information to the information stored in the database elsewhere. Examples of the form in which information that may be carried by the optical marks 110 include its shape, pattern on the optical mark, textual, numerical or alphanumerical characters and color.

By way of an example, the optical marks 110 may be implemented as a series of vertical or horizontal lines resembling "barcodes." A barcode is an optical machine-readable representation of data. Many types of barcodes can be used for the optical marks 110, including one-dimensional and two-dimensional barcodes. In one example, the optical mark is a one-dimensional barcode similar to the conventional Universal Price Code (UPC). In this example, the barcode includes a sequence of alternating bars and spaces representing binary bits (ones and zeroes) of data. Sequences of binary bits may represent digits, letters, symbols, etc. as known to those skilled in the art. Although the following examples may refer primarily to the use of barcodes as the optical marks, it is to be appreciated that other types of code may serve as the optical marks, such as, for example block patterns, color-coding or alphanumeric character codes.

As described above, each of the optical marks 110A-110C is already placed at certain roadside infrastructure, and thus its geographic coordinate is fixed and known. In the example shown in FIG. 1, the first optical mark 110A is positioned at (42.262930, −71.802272), the second optical mark 110B is positioned at (42.262771, −71.802336) and the third optical mark 110C is positioned at (42.262927, −71.802527). Of course, large numbers of optical marks 110 can be placed in the environment where the positioning system 100 is used, but the positioning system 100 requires minimum of three optical marks be optically recognized at a given time, and each of them need to be different from one another, at least within certain geographic boundary (e.g., a town, a city, every 10 mile radius, etc.). If an optical mark of the same pattern is to be used multiple times in the environment, there must be some mechanism for the positioning system 100 to differentiate those optical marks and their geographic coordinate. For instance, the positioning system 100 can be configured such that the optical marks captured in one predefined region (e.g., city or state) may be treated differently from the identical optical marks captured in another region.

In some embodiments, predefined landmarks captured in the digital image can serve as an optical mark 110. When using landmarks as the optical marks 110, the positioning module 200 is configured to make a determination as to whether a set of stored visual characteristic information of at least one landmark matches a visual characteristic information of the landmark captured in the digital image obtained by the positioning module 200. The most reliable methodology is to utilize as much a priori information as possible from readily available mapping sources for the proximate working region of the positioning module 200. Examples of a priori information are locations of major road features such as intersections, lane markings, cross roads, bridges, business buildings, and overpasses. Once this high-level a priori world information is identified along the desired route, it is necessary to identify sub-features that characterize these higher-level landmarks. For example, an intersection can be characterized and identified by the presence of a stop sign, traffic lights, road markings, and even the shape of its curbs.

A camera module, which may be provided as a part of the positioning module 200 or provided as a separate component of a vehicle, is used to obtain images of the surrounding scene. Field of view (FOV) is the area of the inspection captured on the camera's image sensor, and the extent of area captured within the digital image is dependent on the field of view (FOV) of the camera module. The size of the field of view and the size of the camera's image sensor directly affects the resolution of the resulting image, which is one determining factor in accuracy of the positioning system 100.

As mentioned, an optical mark database may be provided for the positioning system 100 and accessible by the positioning module 200. As will be described in more detail below, the optical mark database contains and/or is updated to contain information concerning the optical marks 110 and the geographical coordinates associated with those optical marks 110. A processor, which may be part of the positioning module 200 or a separate component, is configured to analyze the captured image to identify the optical marks 110 within the image, and obtain the geographical coordinates of the optical marks 110 found in the analyzed image from the optical mark database. In embodiments where prespecified landmarks are also used as the optical marks 110, the positioning system 100 may further include a landmark database storing data (e.g., visual characteristics) associated with various landmarks. For each landmark used as the optical mark 110, the landmark database also stores its geographic coordinates.

Figure 2:
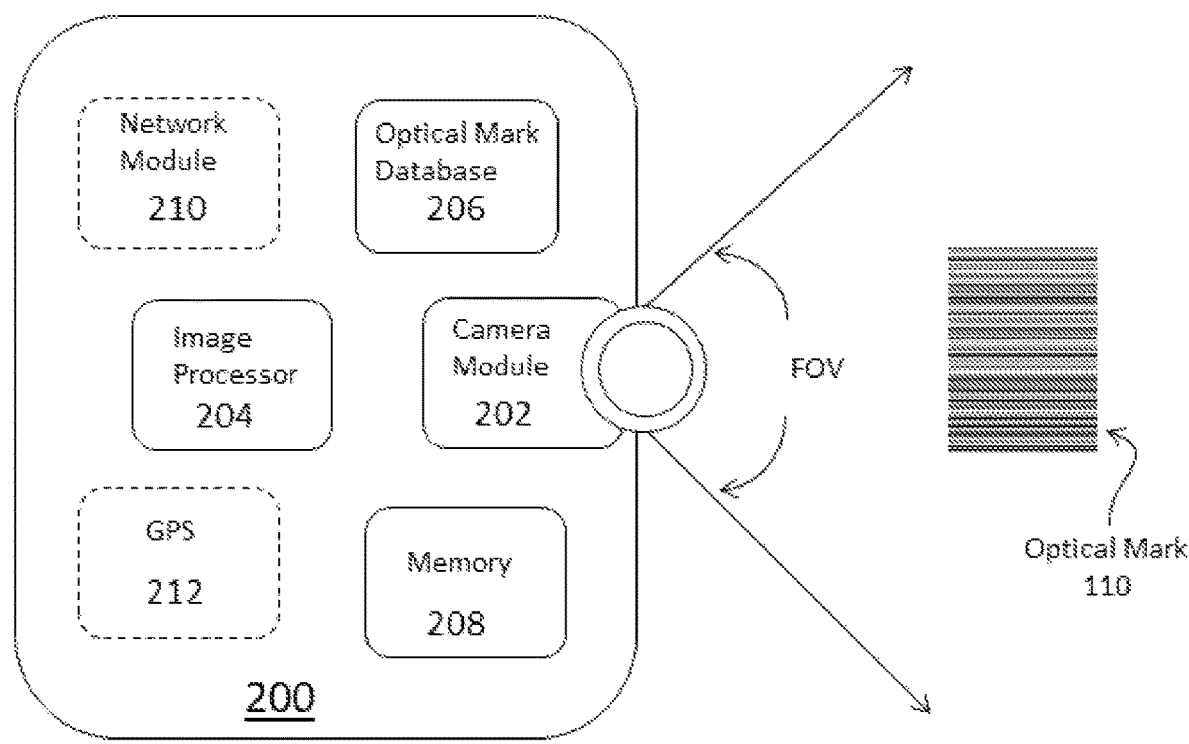
FIG. 2 is a block diagram of an exemplary positioning module 200, according to aspects of the present invention.

Referring now to FIG. 2, there is illustrated a block diagram of an exemplary positioning module 200. The positioning module 200 includes an imaging apparatus, such as a camera module 202, an image processor 204, a and an optical mark database 206. It is to be appreciated that the positioning module 200 may be provided in various devices such as a mobile personal device (e.g., smartphone) as well as vehicle navigation device. The positioning module 200 may be implemented as a self-contained unit, for example a handheld unit or unit configured for mounting on or in a vehicle, or may be integrated within the vehicle. In addition, the positioning module 200 may be a standalone system and may be used exclusively to determine the location of the navigator, or may be used in conjunction with a GPS unit to supplement GPS satellite data in a GPS denied environment, as discussed further below. Accordingly, although the embodiments described in the present disclosure may refer primarily to the positioning system 100 being used in conjunction with a vehicle moving through the street, and therefore the optical marks may be placed on roadside infrastructure, it is to be appreciated that the positioning system 100 is not limited to vehicular use and the optical marks 110 may be deployed anywhere in the relevant navigation environment, not just limited to roadside infrastructure.

The camera module 202 is configured to capture images of the environmental scene within its field of view (FOV), and accordingly may include one or more imaging sensors along with a controller for managing various functions of the camera module 202. The positioning module 200 may also include memory 208 for storing the images as well as executable programming used to manage and control various functions on the positioning module 200.

The positioning module 202 can be configured to take panoramic or even 360 degrees image of the scene. In some embodiments, the camera module 202 employs a camera with a wide angle lens whose focal length is substantially smaller than the focal length of a normal lens for a given film plane. Typically, a lens is considered wide-angle when it covers the angle of view between 64° and 84°. However, ultrawide angle lens covering even greater angle of view can be used for the camera module 202.

Some distortion at the edge region of the digital image is expected to result as the angle of view covered by a camera becomes wider, and this may affect the apparent relative size of the subject in the mid-region of the image and the edge-region of the image. In other words, the actual amount of fractional viewing angle covered per pixel located at the mid-region of the image sensor (hence the pixel at the mid-region of the digital image) may differ from the amount of fractional viewing angle covered per pixel located at the edge-region of the image sensor. Various methods can be used by the positioning modules 200 to compensate for the image distortion from using wide angle lenses.

For instance, the positioning module 200 may be configured to disregard optical marks 110 captured in the predefined edge-region of the digital image or configured to apply different multiplier when converting pixel distance into an angle between a pair of observed optical marks 110. The proportion of the mid-region and the edge-region in the image sensor (and the resulting digital image) can be predefined based on the viewing angle of the camera (and the camera module 202). In a preferred embodiment, the central portion of the digital image that can provide rectilinear image is defined as the mid-region, and the edge portion of the digital image that provides curvilinear image is defined as the edge-region. By way of an example, a mid-region and an edge-region can be defined for the digital image (or the mid-region and the edge-region of the image sensor), and when calculating the angle from the pixel distance between two optical marks captured within the digital image, the pixels positioned in the mid-region can be converted to 0.1 degree of viewing angle whereas the pixels positioned in the edge-region is converted to 0.2 degree of viewing angle when converting the pixel distance to an angle subtended between a pair of optical marks 110.

Such irregularity in the viewing angle coverage among the pixels of the digital image can be problematic when converting the pixel distance between a reference pixel of one optical mark and a reference pixel of another optical mark captured in the digital image. Accordingly, in some embodiments, the positioning module 200 is configured to disregard optical marks 110 captured in the pre-defined edge region of the digital image or crop the edge-region of the digital image even before scanning the remainder of the image for optical marks 110.

Another way of obtaining an image covering wide FOV while reducing image distortion is by stitching multiple images. Distinctive features can be found in each image and then efficiently matched to rapidly establish correspondences between pairs of images. When multiple images exist in a panorama, known techniques developed in the art may be used to compute a globally consistent set of alignments and to efficiently discover which images overlap one another.

Accordingly, in some embodiments, the camera module 202 employees multiple cameras, each camera covering specific range of FOV and facing different direction. To stitch the multiple images captured by the multiple cameras, each of the cameras may be configured to cover horizontal field of view that overlaps with the horizontal field of view of another camera. Alternatively, some other embodiments may utilize a mechanical means, such as a stepping motor, to rotate the camera(s) of the camera module 202 while taking multiple images to cover greater FOV around the positioning module 200. When multiple images are captured, software known in the art can be used to create a seamless panoramic image of wider angle, allowing even the full 360 degrees of horizontal FOV around the positioning module 200 to be represented in a digital image.

By way of an example, an image captured with a 4K camera would have a resolution of 4096×2160. The horizontal angle of field of view that is recorded in each width of pixel depends on the FOV of the camera, which has taken the shot of that image. To fit wider FOV onto the 4096 pixels, each pixel needs to cover wider angle, which in turn reduces the accuracy when determining the angle subtended between two optical marks 110. With higher resolution, each pixel can represent narrower horizontal viewing angle, and this allows for the positioning module 200 to come up with more precise angle subtended between a pair of optical marks 110, which would ultimately provide the positioning module 200 with higher positioning resolution capability. To achieve this, image covering narrower FOV can be captured sequentially side-by-side and then combined together to come up with a digital image covering a desired combined FOV at a desired pixel resolution. For example, a camera can be provided with a 4K image sensor and a lens that covers a FOV of 30 degrees. In this case, horizontal FOV of 30 degrees would be distributed into 4096 pixels spread horizontally. Three cameras of the same specification, each facing 30 degrees apart from one another, can be used to cover a total of 90 degree of FOV. In this way, wider FOV can be covered in a single 12,288 pixel wide digital image while maintaining FOV per pixel ratio.

Generally, the ideal set of images will have a reasonable amount of overlap (at least 10%) to overcome lens distortion and have enough detectable features for panoramic stitching. Accordingly, the camera module 202 equipped with multiple cameras may be configured such that at least 10% of either left edge or right edge of an image taken by each camera overlaps with another image taken by another camera. For instance, each of the cameras of the camera module 202 can be configured so that roughly 410 pixels wide region in either right or left side edge of an image taken by a camera would overlap with 410 pixels wide edge region of another image simultaneously taken by another camera of the camera module 202. In another example, the camera module 202 may be provided with four cameras, each covering 100 degree of horizontal viewing angle. Each of the cameras can be configured so that 10 degrees of horizontal viewing angle overlaps with the horizontal viewing angle of another camera covering the adjacent FOV. In this way, each camera would cover 90 degree of unique horizontal FOV while using 10 degree of horizontal FOV for multi-image stitching purpose, and thereby collectively covering the entire 360 degrees surround horizontal FOV.

The image(s) taken by the camera module 202 is provided to the image processor 204, which processes the image to detect optical marks 110 captured in the image. Whether multiple shots are taken simultaneously using multiple cameras or taken sequentially by using a rotatably mounted camera, the captured images are provided to the image processor 204 to be processed into a single image of X (width) by Y (height) pixel resolution.

The camera module 202 may be configured to take images continuously and direct the image (or a set of simultaneously taken images) to the image processor 204. The images may be taken at periodic intervals, for example, every second, every few seconds, or every fraction of a second. The interval at which the camera captures images may be varied or adjusted. For example, depending on the speed at which the positioning module 200 is traveling, it may be desirable to increase the rate of capture to ensure that a sufficient number of images of the optical marks 110 are obtained. In some embodiments, the camera module 202 is a video camera. The video camera may take continuous video recording of the environment and may compress the video recording to a smaller size using an encoder. The size of the compressed video recording may depend on the quality of the recording needed to extract optical marks. In one example, the camera module 202 monitors the environment for the optical marks 110. If the optical mark 110 is detected within the scene, the video camera may capture still frame images in addition to the video recordings.

The image processor 204 may include both software and hardware components for processing the images, and its functions may be implemented using hardware devices such as field-programmable gate arrays (FPGA's), application-specific integrated circuits (ASIC's), microcontrollers, programmable logic devices (PLD's) or other such devices known in the art. Although the image processor 204 is depicted as a separate block in the exemplary positioning module 200 of FIG. 2, the image processor 204 is incorporated into the camera module 202 in some other embodiments. The camera module 202 may also use other sensors/equipment to improve detection of the optical marks 100 under all lighting and/or weather conditions. For example, high dynamic range (HDR) cameras or even night vision cameras may be employed to capture the optical marks 110 in low light or shadowed conditions. In some embodiments, the optical marks 110 may be reflective or luminescent to improve detection in low-light conditions.

The image processor 204 analyzes all of the pixels in the image to identify pixels that match the qualities associated with the image of the optical mark 110. The image processor 204 may use intelligent pixel processing by identifying and extracting batches of pixels matching certain characteristics, for example special characteristics as found in optical mark 110. These pixels may be filtered out of the image of the scene and processed separately. For instance, a specific color value in the specified range matching the color value range used for the optical mark 110 may be used to filter the image for the optical marks 110 from background scenery of the image. As another example, the optical mark 110 may be deployed with a special characteristic so that they are more easily recognized in comparison to other scenery in the image. A camera that is tailored to recognize that special characteristic of the optical marks 110 (e.g., infrared imaging camera). Isolating the optical marks 110 from the behind scenery may significantly reduce the time necessary for the image processor 204 to identify and match the optical marks 110 in the image, which is a significant advantage in navigation for fast moving object such as automobile. Once the optical mark 110 is recognized, the image processor 204 communicates with the optical mark database 206 to retrieve the geographical coordinate associated with the identified optical marks 110.

The image processor 204 is further configured to identify the pixel coordinate of each of the optical marks 110 within the digital image, and calculate the pixel distance between a pair of optical marks 110 in the digital image. Each of the optical marks 110 would be depicted by a group of pixels in the digital image. An optical mark 110 that is closer to the positioning module 200 would be shown larger than another optical mark that is further away from the positioning module 200. That is, an optical mark that is closer to the positioning module 200 would be represented with greater area of pixels within the image than it is for optical mark that is relatively further away from the positioning module 200.

Figure 1B:
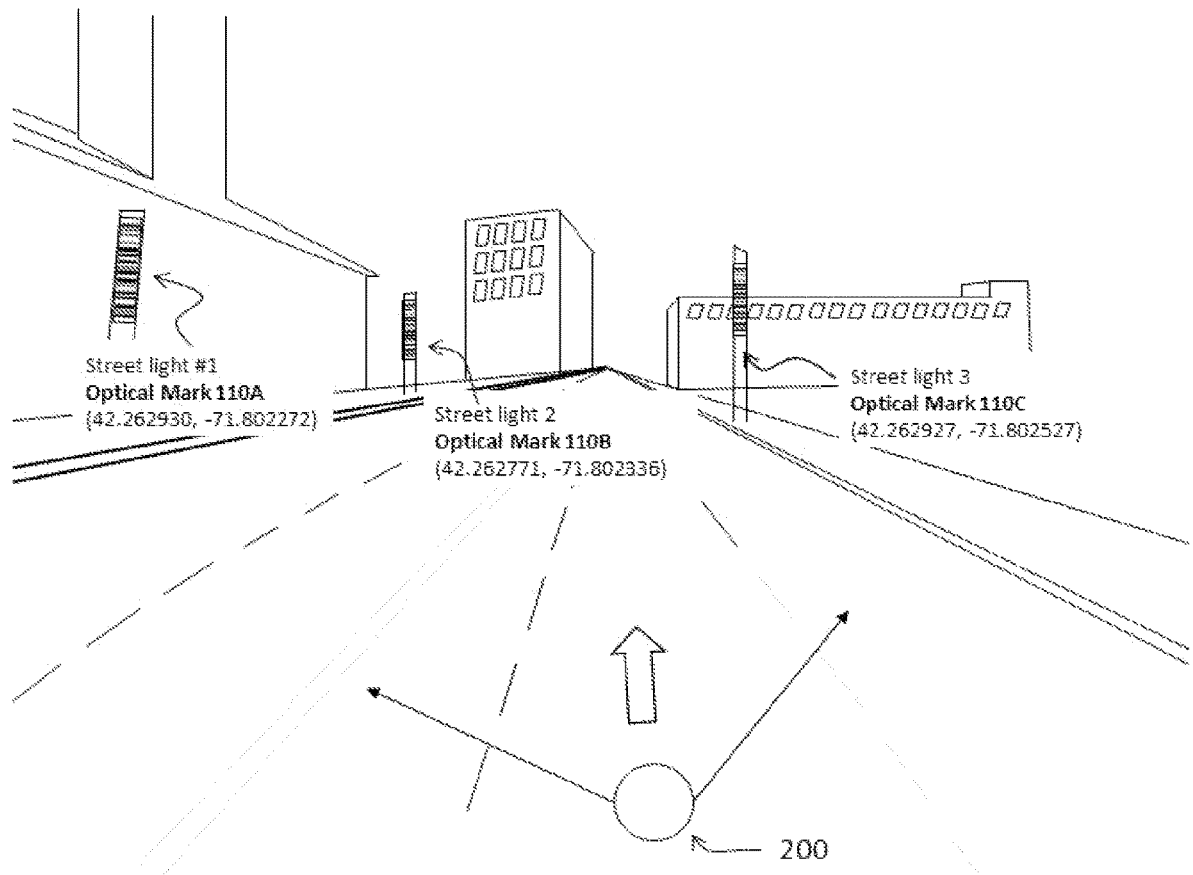
FIG. 1B is a schematic front view of the exemplary working environment adapted for the positioning system 100 using optical marks 110, according to aspects of the present invention.
Figure 3:
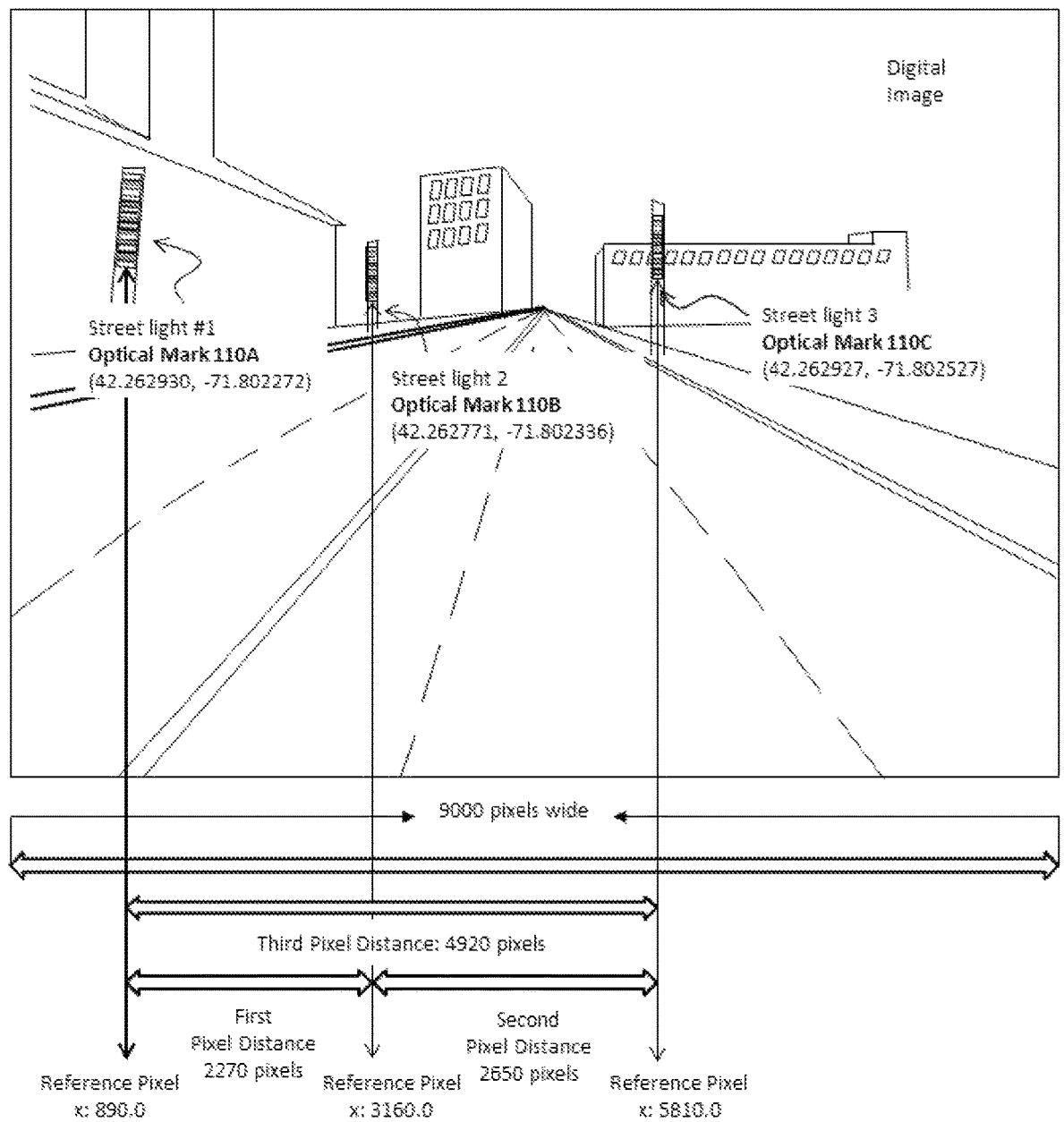
FIG. 3 is a schematic view of an exemplary digital image showing the working environment of the positioning system 100, where three optical marks 110A-110C are captured.

FIG. 3 is an exemplary digital image of the working environment of FIG. 1B, which is captured by the camera module 202. As shown in FIG. 3, the first optical mark 110A is depicted larger than how the second optical mark 110B is depicted in the digital image.

Accordingly, a reference pixel for each optical mark 110 is chosen by the image processor 204 for calculating the pixel distance between the pairs of optical marks 110 within the digital image. The pixel that is at the middle (in terms of x-coordinates) of the pixels representing a given optical mark 110 can be chosen as the reference pixel of that optical mark 110. In some other embodiments, the pixel with the lowest x-pixel coordinate value (or the highest x-pixel coordinate value) among the pixel drawing the given optical mark 110 can be chosen as the reference pixel of that optical mark 110. In yet some other embodiments, the median x-pixel coordinate value of the pixels of the respective optical mark is used as the reference for determining the pixel distance between pairs of optical marks in the digital image.

The image processor 204 calculates the number of pixels in horizontal distance between the reference pixel coordinate of each pair of optical marks 110, then converts each pixel distance into an angle by applying the conversion rate. As described above, the conversion rate is the rate at which each width of pixel represents certain fraction of FOV. Since the positioning module 200 relies on the number of pixels existing between the pixel coordinate of pairs of optical marks in the image to obtain the angle, the accuracy suffers when the size of the optical marks is too small in the digital image. Accordingly, in some embodiments, the positioning module 200 may be configured to disregard optical marks 110 with a pixel width below a predetermined threshold pixel width.

In some instances, certain optical marks 110 may be substantially smaller than other optical marks 110 captured within the same digital image. As described above, the size of the optical marks 110 (that is, the number of pixels used to represent the optical mark) in the digital image varies depending on their relative deployment distance in the working environment. For example, even for optical marks 110 of the same real-life size, the pixel widths of certain optical mark can be in the range of 10 pixels to 100 pixels while the pixel widths of another optical mark 110 captured in the same digital image is in the range of 101 pixels and 300 pixels due to their deployment location. It may not be ideal to obtain the pixel distance between a pair of optical marks of such a large size difference within the digital image.

Accordingly, the positioning module 200 may be configured to choose the first three largest optical marks in the digital image for obtaining the pixel distances. Also, the positioning module 200 may be configured to group optical marks 110 in the digital image by their pixel widths, and only obtain the pixel distances among the pairs of optical marks 110 that belong to the same group. For instance, pixel width of the optical images 110 can be used as the factor for grouping the optical images 110 in the same digital image. In one example, the first group may comprise the optical marks with their pixel width under 100 pixels, the second group may comprise optical marks with their pixel width above 100 pixels and below 500 pixels, and the third group may comprise optical marks with their pixel width above 500 pixels. To the extent that there are at least three optical marks in the third group, the positioning module 200 may be configured to obtain pixel distances between the pairs of optical marks comprised in the third group. If there are less than three optical marks in the third group, then the positioning module 200 would try to obtain the pixels distance between the pairs of optical marks comprised in the second group and so on. If none of the group contains more than three optical marks, then the positioning module 200 may use the pixel distances between pairs of optical marks belonging in different group. In the example shown in FIG. 3, the pixel distance between the x-coordinate of the reference pixel of the first optical mark 110A and the x-coordinate of the reference pixel of the second optical mark 110B is 2270 pixels. The pixel distance between the x-coordinate of the reference pixel of the second optical mark 110B and the x-coordinate of the reference pixel of the third optical mark 110C is 2650 pixels. Lastly, the pixel distance between the x-coordinate of the reference pixel of the first optical mark 110A and the x-coordinate of the reference pixel of the third optical mark 110C is 4920 pixels.

Knowing the geographical coordinates of a pair of optical marks and the angle subtended between that pair of optical marks, a list of coordinates of points that exhibit the same angle in reference to that pair of optical marks can be generated by the positioning module 200. When such list is generated for at least three different pairs of optical marks captured in the digital image, the positioning module 200 starts to identify the coordinate of a point that is present in those lists and returns that coordinate as the location of the positioning module 200.

With enough computing power, the list of coordinates of points forming the converted angle subtended between the given pair of the optical marks can be generated on-the-fly as the pixel distance is converted into the angle. For more rapid operation of the positioning module 200, however, the list of coordinates for predetermined pairs of optical marks 110 can be pre-calculated and stored in a database for retrieval for angle calculated with respect to the pairs of the optical marks. In this case, a coordinate list database may be provided for the positioning system 100 storing the look-up tables for possible angles, which could be associated with the predetermined pairs of optical marks in the working environment. It should be noted that it can be assumed that the camera module 202 would have certain limited range of distance for capturing the optical marks 110, and would be taking the image at some location on the road. As described above, optical marks 110 that are deployed too far away from each other may not provide meaningful value, and thus the predetermined pairs of optical marks 110 may be chosen by their deployment location in the working environment. With such assumption, there are only finite set of pairs of optical marks 110 that can be captured by the camera module 202 at one point.

Figure 4:
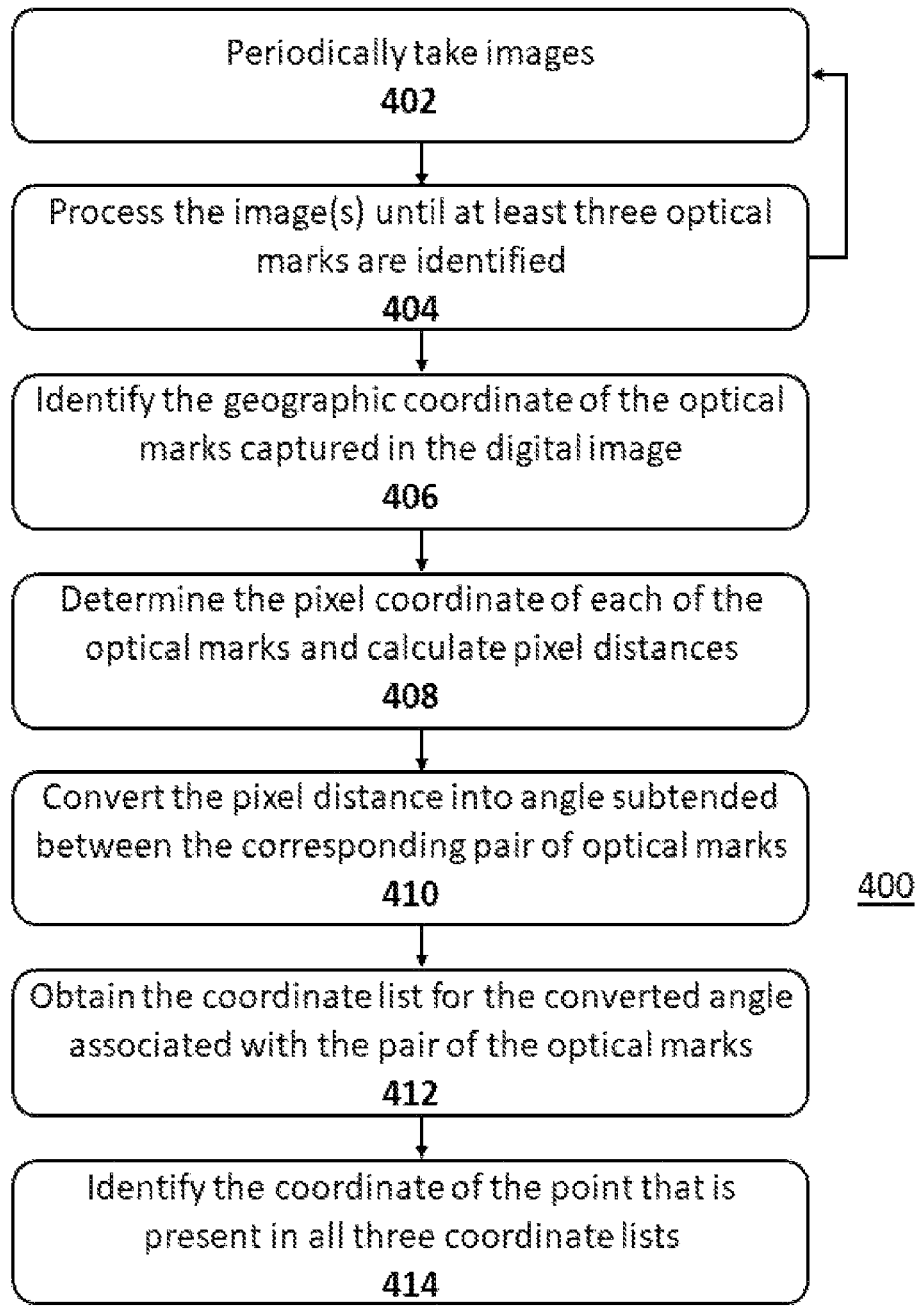
FIG. 4 is a flow diagram illustrating an exemplary method of determining a location of the positioning module 200, according to aspects of the present invention.

A method 400 of determining the location of the positioning module 200, according to one embodiment, is now described with reference to FIG. 4. In step 402, the camera module 202 periodically obtains images of the scene until at least three optical marks 110 are captured in the digital image.

FOV of the camera module 202 may not be wide enough, and a single shot of image may not provide sufficient FOV that includes three optical marks. As described above, the camera module 202 may utilize multiple cameras to cover wider FOV. In some embodiments, the camera module 204 may be configured take a first shot, rotate in a predetermined degree of angle (which should be equal to or less than the viewing angle of the camera), and then take another shot and so on, until all of the images, combined together, either covers a desired FOV or at least three optical marks 110 are captured. In the foregoing cases where the camera module 202 is configured to take multiple shots of images until at least three optical marks 110 are captured within the combined FOV, the image processor 203 may need to process each individual shot of image to determine the presence of optical mark 110 and control the camera module 202 to take additional shots.

In some embodiments, the camera module 202 may be configured to take continuous pictures of the scene and direct the images to the image processor 204. The images may be taken at periodic intervals, for example, every second, every few seconds, or every fraction of a second. The speed at which the camera captures images may be varied or adjusted. For example, depending on the speed at which the vehicle equipped with the positioning module 200 is traveling, it may be desirable to increase the rate at which the camera module 202 captures the images to ensure that a sufficient number of images of the optical marks 110 are obtained.

In some embodiments, the camera module 202 may be provided with a video camera. The video camera may take continuous video recording of the environment and may compress the video recording to a smaller size using an encoder. The size of the compressed video recording may depend on the quality of the recording needed to extract optical mark images. In one example, the camera monitors the environment for the optical marks 110. If the optical mark 110 is detected within the scene, the video camera may capture still frame images in addition to the video recordings. Whether multiple shots are taken simultaneously using multiple cameras or taken sequentially by using a rotating camera, the image processor 204 needs to arrange the multiple images into a single image of a x-by-y pixel resolution.

In step 404, the image processor 204 reads the optical marks 110 by processing the image to decode the optical marks 110. The optical marks 110 may be identified in a captured image using pattern matching techniques known in the art, whereby portions of the image are compared with a known pattern that corresponds to the optical marks 110.

In step 406, the positioning module 200 determines a location of the optical marks 110. As described above, the optical mark database 206 contains the information on the known deployment location of the optical marks 110. The optical marks 110 may be a series of vertical or horizontal bars resembling the UPC barcode. The groups of bars and spaces may represent certain digits. Sequences of digits may represent a value that can be searched against the data stored in the database, which may be compared by the image processor 202 against the known deployment location of the optical marks 110 in the optical mark database 208. Alternatively, sequences of digits may be translated into geographic coordinates, such as longitude and latitude, representing location information of the optical marks 110.

Ideally, each optical mark 110 should be unique and distinct from other optical marks 110 used in the positioning system 100. However, the maximum number of the optical marks 110 that can be deployed in the area may be limited depending on how the optical mark 110 is structured. For example, the lines forming a barcode may need to have a sufficient dimension in order for it to have meaningful difference with other lines of that barcode and recognizable by the image processor 202 scanning the image. The size of the entire barcode may be limited as well, which in turn, limiting the digits representable by the barcode. Accordingly, in some embodiments, the area served by the positioning system 100 can be logically divided into several sub-sections (e.g., town, city, county, state, etc.), and each sub-section can use the same set of optical marks 110. In an example where the sub-section is formed of a state, the first optical mark 110A can be deployed in one location within each of the states, but it cannot be deployed multiple locations within the same state. Of course, the positioning system 100 would need to be able to recognize which state the positioning module 200 is currently operating in, so that the first optical mark 110A in the state of Massachusetts would have a geographical coordinate that is different from the geographical coordinate of the first optical mark 110A in the state of Rhode Island. The general location of the positioning module 200 can be identified from, for example, by analyzing the wireless signals in the vicinity of the positioning module 200.

Once the geographical coordinate of the optical marks 110 are known, the geographical coordinate of the positioning module 200 may then be determined using the angles subtended between at least three sets of pairs of optical marks 110. Here, the subtended angles are obtained through the pixel distance conversion process.

Accordingly, in step 408, the image processor 204 determines the pixel coordinate of each of the optical marks 110 in the processed image. Here, the pixel coordinate of the optical marks 110 means the x-pixel coordinate and the y-pixel coordinate of the given optical mark within the x-by-y pixel resolution of the digital image.

The positioning method of the present invention relies partly on knowing the number of pixels between the pixel coordinate of the optical marks in the captured digital image. Therefore, it is important to have consistency in determining the pixel coordinate of the optical marks 110. Even if the optical marks 110 have the same size in the actual environment, their dimension represented within the two-dimensional digital image (i.e., the number of pixels taken up by the optical mark in the image) would be different from one another based on how far each particular optical mark 110 is located away from the positioning module 200.

In the example illustrated in FIG. 1, the first optical mark 110A is the nearest optical mark from the positioning module 200, and the second optical mark 110B is the farthest optical mark from the positioning module 200. The third optical mark 110C is in the middle in terms of the distance from the positioning module 200. Accordingly, the first optical mark 110A would take up a larger pixel dimension than the amount of pixels for showing the second optical mark 110B within the image. In other words, the pixels representing the first optical mark 110A would span across a greater number of pixels than the number of pixels representing the second optical mark 110B within the image. The dimension of the third optical mark 110C would not be as large as the dimension of the first optical mark 110A, but would be larger than the dimension of the second optical mark 110B.

The pixel distance between a pair of optical marks shown in the image is what the positioning module 200 requires for its operation. In some embodiments, the image processor 204 simply uses either the pixel coordinate of the left (or right) most pixel of each of the optical marks shown in the image in determining the pixel distance between each pair of optical marks. In the example shown in FIG. 3, the x-pixel coordinate of the first optical mark 110A, the second optical mark 110B and the third optical mark 110C are 890, 3160 and 5810, respectively. Such x-pixel coordinate of the optical marks 110 may be the left most pixel of the respective optical mark in the image.

If the positioning module 200 is configured to use the pixel coordinate of the left most pixel of the optical mark for determining the pixel distance, then the pixel coordinate (890, 1100) will be used for the coordinate of the first optical mark 110A. Similarly, the pixel coordinate (3160, 1540) may be set as the coordinate of the optical mark 110B for the purpose of calculating the pixel distance from another optical mark. Likewise, the pixel coordinate (5810, 1320) may be set as the pixel coordinate of the third optical mark 110C.

Based on these pixel coordinates, pixel distances between optical marks of each pairs optical marks are determined. The first pixel distance is the number of pixels (in x-direction) from the x-pixel coordinate of the first optical mark 110A to the x-pixel coordinate of the second optical mark 110B, the second pixel distance is the number of pixels from the x-pixel coordinate of the second optical mark 10B to the x-pixel coordinate of the third optical mark 110C, and the third pixel distance is the number of pixels from the x-pixel coordinate of the first optical mark 110A to the x-pixel coordinate of the third optical mark 110C.

In the example described above, the first pixel distance (in terms of x-coordinate) between the first optical mark 110A and the second optical mark 110B would be 2270 pixels, the second pixel distance between the pixel coordinate of the second optical mark 110B and the pixel coordinate of the third optical mark 110C would be 2650 pixels, and the third pixel distance between the pixel coordinate of the first optical mark 110A and the pixel coordinate of the third optical mark 110C would be 4920 pixels. The positioning module 200 is configured to convert the pixel distance in the horizontal direction into the angle subtended between the pair of subject optical marks in the horizontal plane on which the vehicle is traveling along. Therefore, y-coordinates of the optical marks or the pixel distance in terms of y-coordinate can be discarded.

In some embodiments, the coordinate of the pixel at the middle (or center) of the pixels representing the optical mark in the image is used as the pixel coordinate of that optical mark for improved accuracy in determining the angle subtended between the pairs of optical marks. Assuming the leftmost pixel of the first optical mark is at (890, 1100) and the rightmost pixel of the first optical mark is at (896, 1540), x-pixel coordinate 893 may be set as the coordinate of the first optical mark 110A for the purpose of calculating the pixel distance from the other optical marks shown in the same image. Assuming the leftmost pixel and the rightmost pixel of the second optical mark is at (3160, 1540) and (3162, 1760), respectively, the x-pixel coordinate 3161 may be set as the coordinate of the second optical mark 110B for the purpose of calculating the pixel distance from another optical marks. Assuming the leftmost pixel and the rightmost pixel of the third optical mark is at (5810, 1320) and (5814, 1600), respectively, the x-pixel coordinate 5812 may be set as the pixel coordinate of the third optical mark 110C. When the coordinate of the midpoint of each respective optical mark is used, the first pixel distance (in terms of x-coordinate) between the first optical mark 110A and the second optical mark 110B would be 2268 pixels, the second pixel distance between the second optical mark 110B and the third optical mark 110C would be 2651 pixels, and the third pixel distance between the first optical mark 110A and the third optical mark 110C would be 4919 pixels, which is slightly different from the pixel distance obtained by simply using the coordinate of the leftmost pixel of each optical mark.

In some embodiments, the image processor 204 is configured to upscale the input image into a higher resolution image. Such upscaling may be performed before identifying the optical marks or after identifying the optical marks. When the image is upscaled into a higher resolution, not only the optical marks themselves, but the distances between a pair of optical marks are represented with greater number of pixels. With additional number of pixels, each individual pixel can represent narrower angle, which in turn, allows for more precise angle subtended between a pair of optical marks.

In some embodiments, the input image that contains at least three optical marks 110 may be cropped to eliminate outer regions of the image that are not used in calculating pixel distances between the optical marks 110 in that image. The remaining portion of the image containing the optical marks 110 can be re-sampled and upscaled to the maximum resolution that is afforded by the camera module 202. The cropped portion of the input image, which is now upscaled to a higher resolution, may then be analyzed by the image processor 204 for more precise angle. With the greater detail in the cropped portion of the image, the angle subtended between pairs of optical marks can be calculate more precisely.

Figure 5:
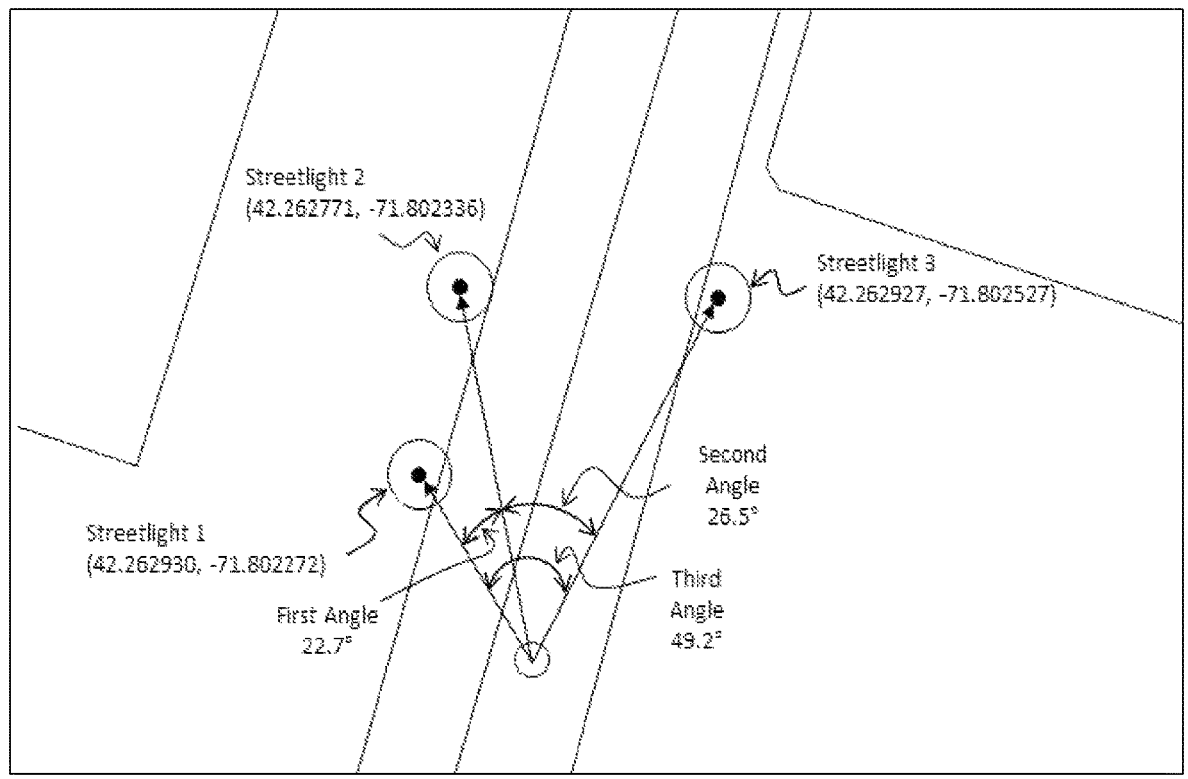
FIG. 5 is a schematic diagram showing exemplary angles subtended between the pairs of the optical marks identified in the image, according to aspects of the present invention.

In step 410, the pixel distances between each pair of the optical marks 110 obtained in step 408 is converted into an angle subtended between the pair of optical marks by using a predetermined conversion rate. That is, the first pixel distance, the second pixel distance and the third pixel distance are converted into the first angle, a second angle and a third angle, respectively, based on the viewing angle covered by each pixel count. Referring to FIG. 5, the first angle is indicative of the angle formed at the viewpoint of the positioning module between the geographic x-coordinate of the first optical mark 110A and the geographic x-coordinate of the second optical mark 110B, the second angle is indicative of the angle formed at the viewpoint between the geographic x-coordinate of the second optical mark 110B and the geographic x-coordinate of the third optical mark 110C, and the third angle is indicative of the angle formed at the viewpoint between the geographic x-coordinate of the first optical mark 110A and the geographic x-coordinate of the third optical mark 110C.

The ratio of the total FOV of the camera module 204 to the resolution of the digital image in the horizontal axis would be the conversion rate used for converting each of the pixel distances into the angle. By way of an example, each pixel would represent 0.1 degrees in the image having 1800×1800 pixel resolution image covering 180 degree of FOV. If the entire 360 degrees around the positioning module 200 is presented in 1800×1800 pixel resolution image, then each pixel of that image would be equal to 0.2 degrees. As such, the conversion rate may be predefined based on the pixel resolution of the image being analyzed and the FOV covered by that image.

Referring to FIGS. 3 and 5, the image covering 90 degrees of FOV is provided in 9000×6000 pixel resolution. In this case, the conversion rate of 0.01 would be applied to convert each of the pixel distances into an angle subtended between the corresponding pair of the optical marks. Accordingly, the first pixel distance of 2270 pixels between the x-coordinate of the first optical mark 110A and the x-pixel coordinate of the second optical mark 110B would be converted into 22.7 degrees. The second pixel distance of 2650 pixels between the x-coordinate of the second optical mark 110B and the x-pixel coordinate of the third optical mark 110C would be converted into 26.5 degrees. Lastly, the third pixel distance of 4920 pixels between the x-pixel coordinate of the first optical mark 110A and the third optical mark 110C would be converted into 49.2 degrees.

Knowing the angle subtended between a pair of two optical marks, points that have the angle subtended between the geographical coordinates of those two optical marks can be calculated. Accordingly, in step 412 of FIG. 4, the positioning module 200 generates at least three coordinate lists, each of which contains the coordinates of group of points that have the angle subtended between the geographical coordinates of the given pair of optical marks.

The number of points (hence the number of coordinates) that are included in the lists depends on how detail the geographical coordinate of the optical mark is (i.e., the length of the longitude/latitude) and the angle subtended between those two optical marks are. The more detailed the geographical coordinate and the angle formed between the pair of optical marks, the greater the number of points that can be included in the list prepared by the positioning module 200. It should be noted that those points in each list, when laid on a plane, would form a circle. Accordingly, the positioning module 200 may first simulate a circle using only the coordinates of the points provided in the list, and then supplement the list with the coordinates of additional points that would be on the path of the simulated circle.

Figure 6:
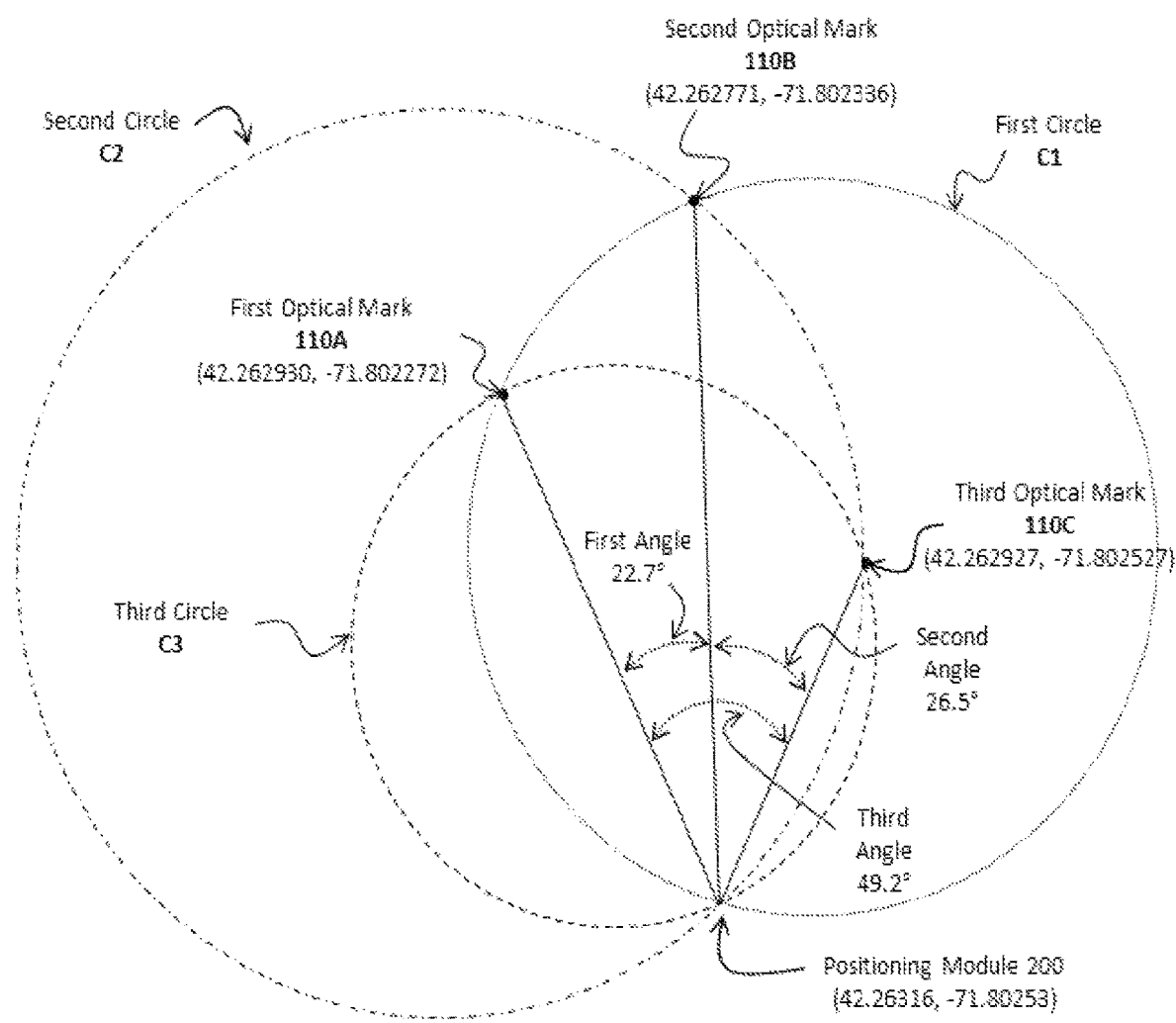
FIG. 6 is a schematic diagram illustrating the intersecting point among the points in the coordinate lists for determining a position fix of the positioning module 200, according to aspects of the present invention.

Referring to FIG. 6, the first circle C1 can be formed of a group of points in the first coordinate list, which can form the first angle (22.7 degrees) between the geographical coordinate of the first optical mark 110A and the geographical coordinate of the second optical mark 110B. The second circle C2 can be formed of a group of points in the second coordinate list, which can form the second angle (26.5 degrees) between the geographical coordinate of the second optical mark 110B and the geographical coordinate of the third optical mark 110C. Lastly, the third circle C3 can be formed of a group of points in the third coordinate list, which can form the third angle (49.2 degrees) between the geographical coordinate of the first optical mark 110A and the geographical coordinate of the third optical mark 110C. It should be noted that the point representative of the location of the positioning module 200 would be included in each of the coordinate lists. Accordingly, in some other embodiments, the positioning module 200 can generate the first coordinate list, second coordinate list and the third coordinate list by obtaining the coordinates of the points that are part of the first circle C1, the second circle C2 and the third circle C3, respectively.

In the example shown in FIG. 6, the geographic coordinate of a point which forms the first angle (22.7 degrees) between the first optical mark 110A and the second optical mark 110B can be scaled or otherwise identified. Based on the geographic coordinates these three points, the first circle C1 can be formed. That is, the first circle C1 can be defined with three points, the first optical mark 110A being the first point, the second optical mark 110B being the second point, and any one point that forms the first angle between the first optical mark 110A and the second optical mark 110B being the third point. The coordinates of the points along the first circle C1 may be collected and prepared as a dataset (e.g., a hash-map, lookup table). All of the points that form the first angle between the first optical mark 110A and the second optical mark 110B are the potential candidate for the position of the positioning module 200.

Similarly, the geographic coordinate of a point which forms the second angle (26.5 degrees) between the second optical mark 110B and the third optical mark 110C can be scaled to or otherwise identified, and the second circle C2 can be simulated from the geographic coordinate of the second optical mark 110B, the geographic coordinate of the third optical mark 110C and the geographic coordinate of the point forming the second angle between the second and third optical marks. Here, the second circle C2 can be defined with three points, the second optical mark 110B being the first point, the third optical mark 110C being the second point, and any one point that forms the second angle between the second optical mark 110B and the third optical mark 110C being the third point. The coordinates of the points along the second circle C2 may be collected and prepared as a dataset (e.g., a hash-map, lookup table). All of the points that form the second angle between the second optical mark 110B and the third optical mark 110C are the potential candidate for the position of the positioning module 200.

Likewise, a geographic coordinate of a point which forms the third angle (49.2 degrees) between the first optical mark 110A and the third optical mark 110C can be scaled to or otherwise identified, and the third circle C3 can be simulated in reference to the geographic coordinate of the first optical mark 110A, the geographic coordinate of the second optical mark 110B and the geographic coordinate of the point forming the third angle between the first and second optical marks. Here, the third circle C3 can be defined with three points, the first optical mark 110A being the first point, the third optical mark 110C being the second point, and any one point that forms the third angle between the first optical mark 110A and the third optical mark 110C being the third point. The coordinates of the points along the third circle C3 may be collected and prepared as a dataset (e.g., a hash-map, lookup table). All of the points that form the third angle between the first optical mark 110A and the third optical mark 110C are the potential candidate for the position of the positioning module 200.

In some embodiments, the positioning module 200 can generate the first coordinate list, on-the-fly, by calculating the coordinates of the points where the first angle can be formed between the geographic coordinate of the first optical mark 110A and the geographic coordinate of the second optical mark 110B. Similarly, the positioning module 200 generates the second coordinate list, on-the-fly, by calculating the coordinates of the points where the second angle can be formed between the geographic coordinate of the second optical mark 110B and the geographic coordinate of the third optical mark 110C. Lastly, the positioning module 200 generates the third coordinate list, on-the-fly, by calculating the coordinates of the points, where the third angle can be formed between the geographic coordinate of the first optical mark 110A and the geographic code of the third optical mark 110C.

Figure 7:
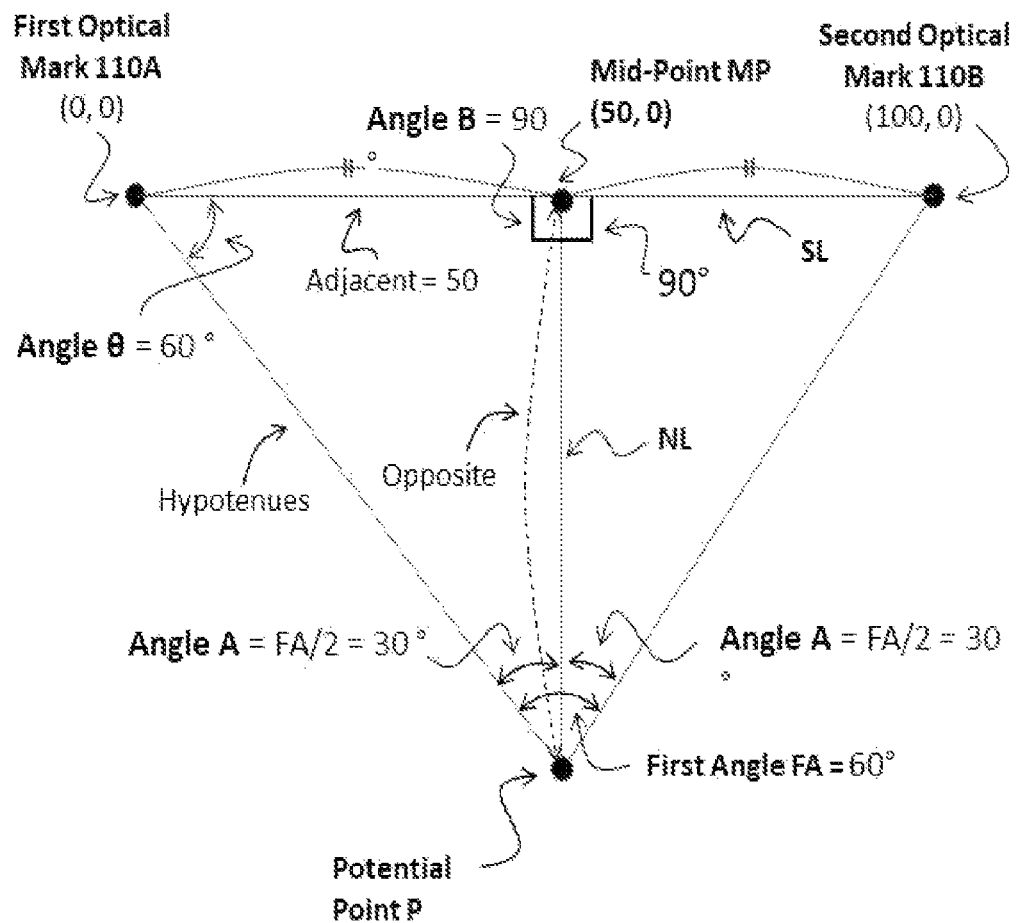
FIG. 7 is a schematic diagram illustrating an exemplary method for simulating a circle using the coordinates of a pair of the optical marks and the coordinate of one possible point that would be included in the coordinate list (i.e., a point that could potentially be the location of the positioning module 200).

FIG. 7 shows an example of calculating the coordinate of potential point where the positioning module 200 could be located from the coordinates of a pair of optical marks and the angle that was converted from the pixel distance between the pair of optical marks. For purposes of simpler explanation, the coordinates of the first optical mark 110A is at (0, 0), the coordinate of the second optical mark 110B is at (100, 0), and the first angle "FA" subtended between the first optical mark and the second optical mark is 60 degrees in the example of FIG. 7.

It should be noted that, for any given pair of optical marks, one of collection of points that could potentially be the location of the positioning module 200 (i.e., a point that would be included in the coordinate list, and denoted "P" in FIG. 7) will be on the line that is normal (denoted "NL" in FIG. 7) to the straight-line connecting the pair of optical marks (denoted "SL" in FIG. 7) at the mid-point (denoted "MP" in FIG. 7) of the straight-line SL connecting the pair of optical marks. Accordingly, the coordinate of that potential point P can be identified if its distance from the mid-point MP between the pair of optical marks is calculated. In other words, the coordinate of that potential point P can be identified if the height "H" of the line NL from the mid-point MP is identified.

Here, the assuming the first optical mark is at (0, 0) and the second optical mark is at (100, 0), the coordinate of the mid-point MP will be (50, 0). Now, a simple right triangle trigonometric ratio can be used to calculate the distance from the mid-point MP to the point P. As mentioned, the potential point P is on the line NL at the mid-point MP, extending in the normal direction from the line SL connecting the first optical mark 110A and the second optical mark 110B. Since the potential point P is on the line NL extending from the mid-point MP, the angle "A" will be the half of the first angle FA, and thus the angle "C" will be 60 degrees (180°−Angle A−Angle B=Angle θ). Note that Angle A will always be half of the angle converted from the pixel distance between the given pair of the optical marks, and the Angle B will always be 90°. Knowing the angle θ and the length of the adjacent line, the length of the opposite line can be calculated using right triangle trigonometric formula. For instance, formula $$\tan\theta = \frac{\text{opposite}}{\text{adjacent}}$$

can be used to find the length of the opposite line. In the example shown in FIG. 7, it would be 50 tan 60=length of the opposite line, which is 86.60254038. Accordingly, the coordinate of point P, which is one of the possible points of the positioning module 200, is (50, 86). Now, the first circle C1 can be simulated using the coordinate of the first optical mark 110A, the second optical mark 110B and the point P, and the first coordinate list can be generated from the first circle C1. The second coordinate list and the third coordinate list can be generated in the similar way as the first coordinate list.

The three circles C1, C2 and C3 will intersect at one point, which will be the exact location of the positioning module 200. In other words, the first coordinate list, the second coordinate list and the third coordinate list are compared to identify the coordinate of the point that exists in all of those coordinate lists. Referring back to FIG. 4, in step 414, the positioning module 200 identifies the point, which is present in all three coordinate lists. In other words, the positioning module 200 identifies the point where the first circle C1, the second circle C2 and the third circle C3 intersect, which is the point where the positioning module 200 is located. The positioning module 200 returns the geographic coordinate of the determined point as the location of the positioning module 200. It should be noted that the resolution of each of the coordinate lists may differ from one another, and the positioning module 200 may not be able to find the coordinate that is present in each of the coordinate lists if it tries to find the exact match in lengthy decimal digits. Accordingly, the positioning module 200 may be configured such that coordinates of the lists are compared only up to certain pre-determined decimal digits, or configured such that the order of decimal digits would be reduced if there was no exact match in the previous trial for finding the match. For instance, the coordinate of (42.263, −71.802) may be included in the first coordinate list while the second coordinate list includes (42.263, −71.803) and the third coordinate list includes (42.264, −71.802). In this case, the positioning module 200 would not be able to find the exact match if it tries to find the matching coordinate up to three decimal digits. As such, the positioning module 200 may just return (42.26, −71.80) as the coordinate of the point that is present in all three coordinate lists.

Foregoing instructions and the various data described herein for various applications may be stored in files and transmitted using a variety of computer-readable media. A file in a computing device is generally a collection of data stored on a computer readable medium, such as a storage medium, a random access memory and the likes.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention

What is claimed is:

1. A method of determining a location of an object, the method comprising:
    capturing a digital image by a camera module provided on the object, said digital image having a predetermined pixel resolution and containing at least three optical marks, each of the optical marks being associated with a distinct geographic coordinate;
    identifying a pixel coordinate of a reference pixel of each of the optical marks within the digital image, said pixel coordinate being formed of an x-pixel coordinate and a y-pixel coordinate;
    determining a first pixel distance, a second pixel distance and a third pixel distance, the first pixel distance being a number of pixels from the x-pixel coordinate of the reference pixel of a first optical mark and to the x-pixel coordinate of the reference pixel of a second optical mark, the second pixel distance being a number of pixels from the x-pixel coordinate of the reference pixel of the second optical mark and to the x-pixel coordinate of the reference pixel of a third optical mark, and the third pixel distance being a number of pixels from the x-pixel coordinate of the reference pixel of the first optical mark and to the x-pixel coordinate of the reference pixel of the third optical mark;
    multiplying a predefined multiplier to the first pixel distance, the second pixel distance and the third pixel distance to obtain a first angle, a second angle and a third angle, respectively, the first angle being indicative of an angle at the object subtended between a geographic coordinate of the first optical mark and a geographic coordinate of the second optical mark, the second angle being indicative of an angle at the object subtended between the geographic coordinate of the second optical mark and a geographic coordinate of the third optical mark, and the third angle being indicative of an angle at the object subtended between the geographic coordinate of first optical mark and the geographic coordinate of the third optical mark;
    generating a first coordinate list, a second coordinate list and a third coordinate list, the first coordinate list consisting geographic coordinates of points that form the first angle at a given point between the geographic coordinate of the first optical mark and the geographic coordinate of the second optical mark, the second coordinate list consisting geographic coordinates of points that form the second angle at a given point between the geographic coordinate of the second optical mark and the geographic coordinate of the third optical mark, and the third coordinate list consisting geographic coordinates of points that form the third angle at a given point between the geographic coordinate of the first optical mark and the geographic coordinate of the third optical mark; and
    identifying a geographic coordinate of a point that is included in all of the coordinate lists as the location of the object.

2. The method of claim 1, wherein at least some of the optical marks are formed of machine-readable codes.

3. The method of claim 2, wherein at least some of the optical marks are visual landmarks.

4. The method of claim 3, wherein the reference pixel of each of the optical marks is a pixel having the lowest x-pixel coordinate value among pixels depicting the respective optical mark in the digital image.

5. The method of claim 3, wherein the reference pixel of each of the optical marks is a pixel having a median x-pixel coordinate value among pixels depicting the respective optical mark in the digital image.

6. The method of claim 3, wherein the first optical mark, the second optical mark and the third optical mark are chosen in the decremental order of total number of pixels held by the optical marks within the digital image.

7. A positioning module, comprising:
    a camera module with an image sensor for generating a x by y resolution digital image of a view covered by a viewing angle of the camera module;
    a camera module for obtaining a digital image of a predetermined resolution covering a predetermined angle of view;
    a database storing information on three of more optical marks and their geographic coordinates; and
    a processor that is configured to:
    process the digital image taken by the camera module to identify a first optical mark, a second optical mark and a third optical mark from the digital image;
    determine an x-pixel coordinate of the first optical mark, an x-pixel coordinate of the second optical mark and an x-pixel coordinate of the third optical mark of said at least three optical marks;
    calculate a first pixel distance from the x-pixel coordinate of the first optical mark to the x-pixel coordinate of the second optical mark, a second pixel distance from the x-pixel coordinate of the second optical mark to the x-pixel coordinate of the third optical mark, and a third pixel distance from the x-pixel coordinate of the first optical mark to the x-pixel coordinate of the third optical mark;

convert the first pixel distance, the second pixel distance and the third pixel distance into a first angle, a second angle and a third angle, respectively, by applying a predetermined multiplier;

obtain a first look-up table that contains geographic coordinates of points that form the first angle between the geographic coordinate of the first optical mark and the geographic coordinate of the second optical mark;

obtain a second look-up table that contains geographic coordinates of points that form the second angle between the geographic coordinate of the second optical mark and the geographic coordinate of the third optical mark;

obtain a third look-up table that contains geographic coordinates of points that form the third angle between the geographic coordinate of the first optical mark and the geographic coordinate of the third optical mark; and identify a coordinate of a point that is present in all three look-up tables as a coordinate of the positioning module.

8. The positioning module of claim 7, wherein the camera module is provided with a plurality of cameras with overlapping horizontal field of view and configured to take image simultaneously.

9. The positioning module of claim 8, wherein the digital image is a panoramic digital image generated from a combination of multiple images obtained from the plurality of cameras.

10. The positioning module of claim 7, wherein the processor is configured to process and remap pixels at curvilinear edge portions of the digital image to a rectilinear projection of the same field of view.

11. The positioning module of claim 7, wherein the predetermined multiplier for the pixels at the curvilinear edge portions of the digital image is different from the predetermined multiplier for the pixels at the mid-region of the digital image.

12. The positioning module of claim 7, wherein the processor is configured to disregard optical marks in the digital image, which do not span across a predetermined pixel width.

13. The positioning module of claim 7, wherein the processor is configured to disregard optical marks that are positioned outside of a mid-region of the digital image.

14. The positioning module of claim 7, wherein the processor is configured to resample the digital image at a higher resolution before calculating the pixel distances when the positioning module is traveling below a predetermined speed.

15. The positioning module of claim 7, wherein the processor is configured to crop curvilinear edge regions of the digital image before identifying the X-pixel coordinate of the optical marks within the digital image.

16. A positioning system, comprising:
a positioning module having a camera module with an image sensor with a predetermined pixel resolution in which each pixel in the horizontal direction represents a predetermined fraction of horizontal angle of view covered by the camera module;

three or more optical marks optically identifiable by the camera module, each of the optical marks being placed at a predetermined geographic coordinate;

a database storing information on said optical marks and their geographic coordinates;

a processor that is configured to:
activate the camera module to obtain a digital image; process the obtained digital image to identify pixel coordinates of a first optical mark, a second optical mark and a third optical mark shown in the digital image;

determine a first pixel distance, a second pixel distance and a third pixel distance, the first pixel distance being a number of pixels from the x-pixel coordinate of a reference pixel of the first optical mark and to the x-pixel coordinate of a reference pixel of the second optical mark, the second pixel distance being a number of pixels from the x-pixel coordinate of the reference pixel of the second optical mark and to the x-pixel coordinate of a reference pixel of the third optical mark, and the third pixel distance being a number of pixels from the x-pixel coordinate of the reference pixel of the first optical mark and to the x-pixel coordinate of the reference pixel of the third optical mark;

convert the first pixel distance, the second pixel distance and the third pixel distance into a first angle, a second angle and a third angle, respectively, wherein the first angle is an angle at the positioning module subtended between the first optical mark and the second optical mark, the second angle is an angle at the positioning module subtended between the second optical mark and the third optical mark, and the third angle is an angle at the positioning module subtended between the first optical mark and the third optical mark;

obtain a first coordinate list, a second coordinate list and a third coordinate list, and storing said coordinate lists into a memory, wherein the first coordinate list consists of geographic coordinates of points that form the first angle between the geographic coordinate of the first optical mark and the geographic coordinate of the second optical mark, the second coordinate list consists of geographic coordinates of points that form the second angle between the geographic coordinate of the second optical mark and the geographic coordinate of the third optical mark, and the third coordinate list consists of geographic coordinates of points that form the third angle between the geographic coordinate of the first optical mark and the geographic coordinate of the third optical mark; and determine a geographic coordinate of a point that is present in all three coordinate lists as a geographic coordinate of the positioning module.

17. The positioning system of claim 16, wherein the digital image is a panorama image generated from combination of multiple photographic images with overlapping fields of view.

18. The positioning system of claim 16, wherein the optical marks are formed of at least one of machine-readable codes or visual landmarks.

19. The positioning system of claim 16, further comprising a coordinate list database containing coordinate lists pre-calculated for predefined pairs of optical marks.

* * * * *